(No Model.)
O. SHEEHAN.
HEMP CLEANER.
No. 453,945.
Patented June 9, 1891.
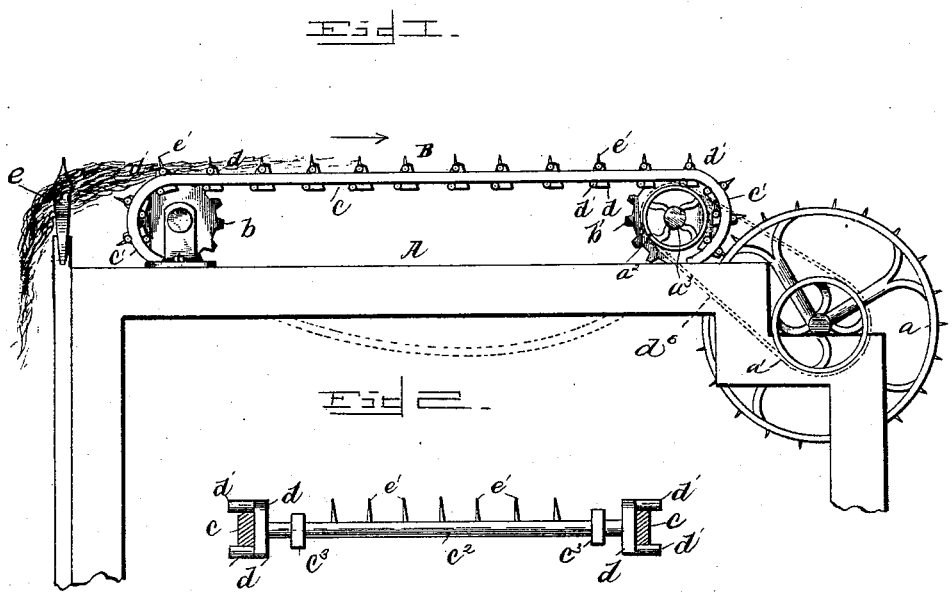
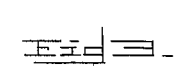
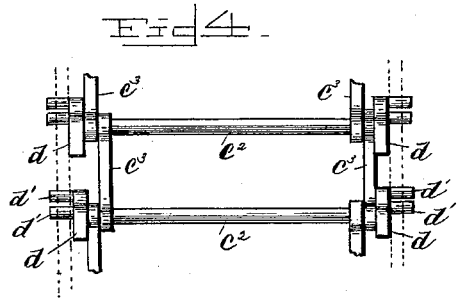

UNITED STATES PATENT OFFICE.

OWEN SHEEHAN, OF NEW BEDFORD, MASSACHUSETTS.

HEMP-CLEANER.

SPECIFICATION forming part of Letters Patent No. 453,945, dated June 9, 1891.

Application filed August 25, 1890. Serial No. 362,953. (No model.)

*To all whom it may concern:*

Be it known that I, OWEN SHEEHAN, a citizen of the United States of America, residing at New Bedford, in the county of Bristol and State of Massachusetts, have invented certain new and useful Improvements in Hemp-Cleaners, of which the following is a specification, reference being had therein to the accompanying drawings.

My invention pertains to certain new and useful improvements in hemp-cleaners; and it consists of the novel construction, combination, and arrangement of the parts, as hereinafter more fully described, and shown in the accompanying drawings, in which—

Figure 1 is a side elevation of a machine embodying my invention, parts being broken away. Fig. 2 is a cross-sectional view thereof. Fig. 3 is a detail perspective view of one of the tooth-carrying bars. Fig. 4 is a detail plan view of a section of the tooth-carrying bars, the rails being shown in dotted lines.

In the embodiment of my invention I employ frame A, in the ends of which is journaled toothed wheel $a$, carrying on its shaft pulley $a'$. On the said frame I journal the shafts of sprocket-wheels $b$ and $b'$, sprocket-wheel $b'$ having a pulley $a^2$ on its shaft $a^3$, said wheel $a^2$ and wheel $a'$ being connected by the band $d^6$. (Shown in dotted lines.)

Secured to the frame A at each side thereof are rails or guides $c\,c$, having their ends curved, as shown at $c'\,c'$. On these rails or guides $c\,c$ moves a sprocket-chain B, composed of tooth-carrying bars $c^2\,c^2$, connected by means of overlapping links $c^3\,c^3$. Bars $c^2\,c^2$ have their ends enlarged at $d\,d$, from which enlargements parallel pins or studs $d'\,d'$ project horizontally, said pins or studs being designed to bear on the lower and upper edges of rails or guides $c\,c$. It will be seen from this construction that by passing the hemp through a guide $e$ at one end of the frame it will be caught up by the teeth $e'\,e'$ on bars $c^2\,c^2$ and carried to the toothed wheel $a$, which revolves in the same direction as the sprocket or hemp-carrying chain, the hemp then being taken from the aforesaid teeth by the teeth of the wheel $a$, from which it is removed in any suitable manner. Thus constructed it will be seen that a simple, durable, and efficient cleaner is produced which may not alone be confined to hemp, but may be used for any other material of similar nature.

Having thus fully described my invention, what I claim, and desire to secure by Letters Patent, is—

The combination of the supporting-frame, the toothed wheel, the rails or guides having curved end portions secured upon said frame, the sprocket-wheels arranged immediately at inside of said curved end portions of the rails, the endless sprocket-chain comprising a series of transverse toothed bars connected together by links and having at their ends enlargements provided with parallel studs engaging the upper and lower edges of said rails or guides, and the endless belt encompassing pulleys on the shaft of said toothed wheel and the shaft of one of said sprocket-wheels, respectively, substantially as set forth.

In testimony whereof I affix my signature in presence of two witnesses.

OWEN SHEEHAN.

Witnesses:
 HOSEA M. KNOWLTON,
 MARY F. HAMBLIN.